May 4, 1948.    O. J. HUELSTER    2,440,685
SOCKET FOR SNAP FASTENERS
Filed Sept. 28, 1944
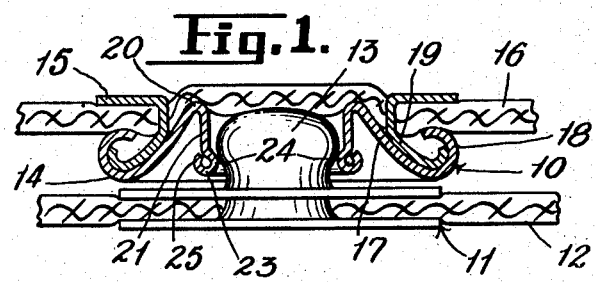
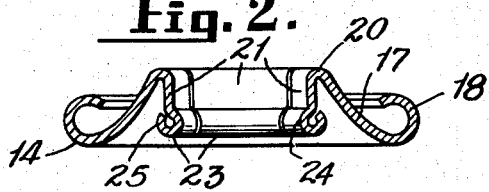
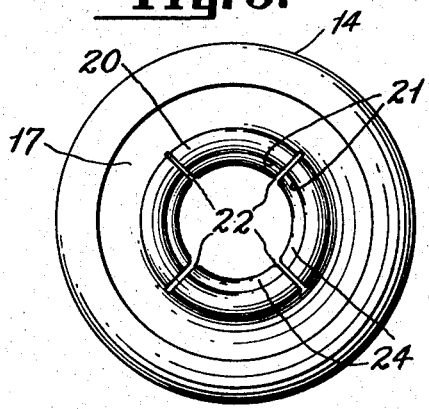
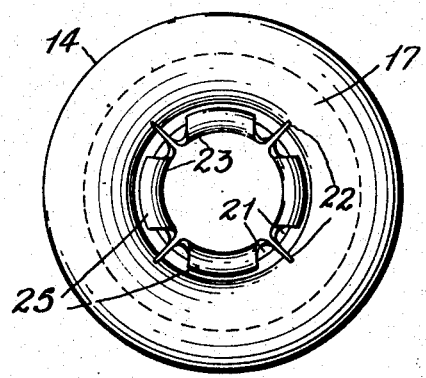
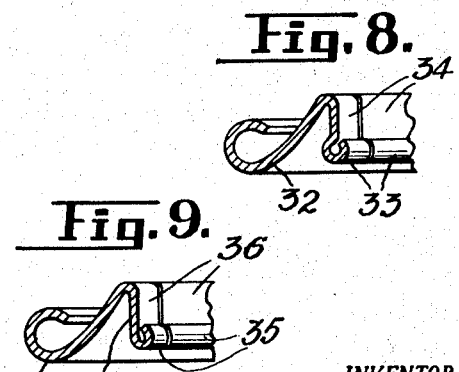
INVENTOR.
Otto J. Huelster
BY
Howard E. Thompson Patented May 4, 1948

2,440,685

UNITED STATES PATENT OFFICE 2,440,685

SOCKET FOR SNAP FASTENERS

Otto J. Huelster, Waterbury, Conn., assignor to Scovill Manufacturing Company, Waterbury, Conn., a corporation of Connecticut Application September 28, 1944, Serial No. 556,235

9 Claims. (Cl. 24—217)

This invention relates to socket members of snap fastener devices. More particularly, the invention comprises the use of a socket member having an imperforated downwardly and outwardly flared wall portion, sometimes referred to as a breast wall, with a plurality of gripper fingers extending into the socket member integrally from the upper edge of said wall forming a stud receiving bore or passage in said member, and still further, wherein the free ends of the gripper fingers are provided with rounded or beaded projections to provide at side portions of each gripper finger substantially point or line contacts with a stud head in coupling and uncoupling a stud with the socket member thereby minimizing frictional engagement in the use of the fastener and also minimizing the wear upon the stud head. The novel features of the invention will be best understood from the following descriptions when taken together with the accompanying drawing, in which certain embodiments of the invention are disclosed, and in which the separate parts are designated by suitable reference characters in each of the views; and in which:

Fig. 1 is a sectional view through a socket part made according to my invention illustrating the same mounted upon a support and also showing in side elevation a stud part arranged in the socket part.

Fig. 2 is a view similar to Fig. 1 showing only the socket member of a socket part.

Fig. 3 is a top plan view of the structure seen in Fig. 2.

Fig. 4 is a bottom plan view of the structure as seen in Fig. 2.

Fig. 5 shows diagrammatic cross sectional views illustrating, in one half, the position of the gripper fingers engaging a stud as in Fig. 1, and in the other half the opposed gripper fingers in the operation of passing the beaded ends thereof over the stud head, inner surfaces only of the gripper fingers being shown.

Fig. 6 is a view similar to Fig. 2, showing a modification.

Fig. 7 is a partial plan view of a structure as seen in Fig. 6, with part of the construction broken away and in section.

Fig. 8 is a view similar to Fig. 2, showing only a part of the construction and showing a modification; and Fig. 9 is a view similar to Fig. 8, showing another form of construction which I employ.

For the purpose of illustrating the general assemblage of a snap fastener, I have shown in Fig. 1 of the drawing a socket part 10 and a stud part 11. The stud part 11 is secured to a suitable support 12, and comprises an enlarged head 13 arranged on one surface of the support 12 and adapted to enter the socket part 10 in coupling said parts together.

The socket part 10 comprises a socket member 14 and a mounting or attaching ring 15 for securing the part 10 to a suitable support 16. The part 14 comprises an imperforated downwardly and outwardly flared wall 17, sometimes referred to as a breast wall. The outer end of this wall terminates in an upwardly and inwardly turned annular peripheral flange 18 adapted to receive the prong members 19 of the coupling or mounting ring 15, as in other devices of this kind.

Extending integrally from the upper and inner end 20 of the wall 17, are a plurality of downwardly extending gripper fingers 21 which join the wall 17 in a sharp bend at the end 20 of said wall. In the construction shown, and in illustrating one adaptation of the invention, four of the gripper fingers 21 employed, as will clearly appear from a consideration of Fig. 3 of the drawing, the fingers 21 are formed by four slots or slits 22, which extend through the sharply bent end 20 of the wall 17, thus leaving the fingers free to flex radially within the wall portion 17 of the socket member 14.

The lower ends of the fingers 21 terminate in beads 23, which are substantially circular in cross sectional form and project, as seen at 24, Fig. 1 of the drawing, into the bore or socket defined by the fingers 21 to engage the stud head 13 and also project, as seen at 25, beyond the outer surface of the fingers 21 to adapt the socket member as a stud part for engagement with tubular socket parts adapted to enter the member 14 between the wall 17 and the fingers 21. Devices of this kind are known in the art.

The beads 23 form rounded projections, as at 24 for engagement with the stud head 13 and minimize frictional engagement with the head in coupling and uncoupling the stud part with the socket part. In this operation, it will appear from a consideration of the right hand showing of Fig. 5, that the inward projections 24 of the beads 23 engage the stud head 13 at the ends of the fingers, as seen at 26, establishing at the points 26 point or line contact with the stud head 13, leaving the remainder of the projections 24 free and clear of the head, as indicated by the clearance space at 27 in Fig. 5.

Reference is above made to the highpoint of contact of the stud head 13 with the projections 24 of the beads 23. However, at this point, the spring fingers are at their greatest tension and exert the greatest amount of pressure on the stud head. By providing the rounded projections 24 the wear upon the stud head is minimized and the tendency to gouge or cut into the stud head as experienced by using simply inturned flanges having sharp edges is dispensed with. It will therefore be apparent that socket members of the type and kind described will provide longer service.

With the construction shown in Figs. 1 to 4 inclusive, the beads 23 are substantially circular in cross sectional form or in other words, are almost completely closed. However, in Fig. 6 of the drawing is shown a socket member 28 which differs from the socket member 14 simply in leaving the beads 29 at the inner ends of the fingers 30 open or to form these beads around a split spring ring 31, the purpose of which is to add spring tension to the fingers 30, particularly when it is desired to provide a firmer engagement of the socket member with the stud member. On the other hand, this construction is also desirable where the socket member may be made of very thin sheet material in order to give the desired spring properties to the fingers, and still further to socket members composed of plastic materials where the plastic material may not have sufficient spring properties to insure firm engagement of the socket member with a stud member. In this connection, it will be understood that the several parts of the fastener may be composed of sheet material of any type and kind. As the socket member 28 is otherwise of the same construction as the member 14, no further detailed description will be made of the structure shown in Figs. 6 and 7.

In Fig. 8 of the drawing is illustrated another slight modification of the structure shown in Figs. 1 to 4 inclusive. In Fig. 8, a part of a socket member is shown at 32, and this member differs from the member 14 simply in the manner of forming the beads 33 on the spring gripper fingers 34. With the socket member 14 the beads are formed by bending the strip material of the fingers outwardly. In Fig. 8, the beads are formed by bending the fingers of the strip material inwardly. In both instances, the rounded surfaces are provided on the fingers for engagement with the stud head in coupling and uncoupling the stud part with the socket part.

In Fig. 9 of the drawing I have shown another modification which differs from the structure shown in Fig. 8, in forming the beads or projections 35 at the inner ends of the gripper fingers 36 of a socket member 37 on the inner surfaces only of said fingers, leaving the outer surfaces 38 of the fingers plain and unobstructed. This type of construction adapts the socket member for use only with stud parts of the general type and kind shown in 11 in Fig. 1 of the drawing. However, in operation, the structure of Fig. 9 will perform the same as with the structure in Fig. 8.

In all cases, it will be apparent that the beads or projections on the free ends of the gripper fingers are arranged within the lower surface of the socket member, or in other words, is circumferentially enveloped by the imperforated wall portion of the socket member. This type of construction is desirable, particularly from the standpoint of laundering, in that the wall portion or breast wall of the socket member protects the gripper fingers against any crushing strain in passing through laundering machines, thus maintaining proper operation of the socket member at all times. Furthermore, this construction permits the formation of relatively thin socket parts which do not present any material bulk or thickness upon the support to which the socket part is attached.

Having fully described my invention, what I claim as new and desire to secure by Letters Patent is:

1. A socket part for snap fasteners, said part comprising a tubular socket forming member, said member having a circumferentially continuous rigid wall terminating at its periphery in an inturned curved annular flange, a plurality of circumferentially arranged gripper fingers extending integrally from the inner end of said wall and forming a stud receiving bore arranged within circumferential boundaries of said wall, said fingers having at their lower ends beaded projections extending into the bore of said member beyond the limits of said fingers, and said projections being curved concentrically with respect to the axis of said member.

2. A socket part for snap fasteners, said part comprising a tubular socket forming member, said member having a circumferentially continuous rigid wall terminating at its periphery in an inturned curved annular flange, a plurality of circumferentially arranged gripper fingers extending integrally from the inner end of said wall and forming a stud receiving bore arranged within circumferential boundaries of said wall, said fingers having at their lower ends beaded projections extending into the bore of said member beyond the limits of said fingers, said projections being curved concentrically with respect to the axis of said member, and said beaded projections extending beyond outer surfaces of said fingers.

3. A socket part for snap fasteners, said part comprising a tubular socket forming member, said member having a circumferentially continuous rigid wall terminating at its periphery in an inturned curved annular flange, a plurality of circumferentially arranged gripper fingers extending integrally from the inner end of said wall and forming a stud receiving bore arranged within circumferential boundaries of said wall, said fingers having at their lower ends beaded projections extending into the bore of said member beyond the limits of said fingers, said projections being curved concentrically with respect to the axis of said member, the beaded projections of said fingers collectively forming an annular recess on said fingers, and a split ring mounted in said annular recess.

4. In snap fasteners employing socket and stud parts, a socket part comprising a socket member of tubular form, the bore of said member being defined by circumferentially arranged gripper fingers, said fingers having a predetermined curvature in defining the cross sectional contour of the bore of said socket member, free end portions of said fingers having stud engaging portions projecting into the bore defined by said fingers, said stud engaging portions forming a restricted passage in the bore of said fingers for engagement with the stud part, said stud engaging portions being curved in cross sectional form minimizing frictional engagement of said portions with a stud part, said stud engaging portions being curved concentrically with respect to the axis of the socket member, a split spring ring engaging all of said fingers, and said stud engaging portions projecting beyond outer surfaces of said fingers forming means for retaining the ring against displacement therefrom.

5. In snap fasteners employing socket and stud parts, a socket part comprising a socket member of tubular form, the bore of said member being defined by circumferentially arranged gripper fingers, said fingers having a predetermined curvature in defining the cross sectional contour of the bore of said socket member, free end portions of said fingers having stud engaging portions projecting into the bore defined by said fingers, said stud engaging portions forming a restricted passage in the bore of said fingers for engagement with the stud part, said stud engaging portions being curved in cross sectional form minimizing frictional engagement of said portions with a stud part, said stud engaging portions being curved concentrically with respect to the axis of the socket member, and said stud engaging portions including parts projecting beyond outer surfaces of said fingers.

6. In socket parts for coupling and uncoupling with a stud part of snap fastener devices, said socket part comprising an imperforated breast wall, means forming a tubular member entirely within circumferential boundaries of said breast wall, said means comprising gripper fingers integrally united with the inner end of the breast wall, gripper means at the free end portions of each of said fingers, said gripper means presenting on the inner surfaces of the fingers at the side portions thereof rounded stud engaging projections minimizing frictional engagement with a stud part in coupling and uncoupling the same with the socket part, a spring ring engaging all of said fingers, and means on the fingers retaining said spring ring against displacement therefrom.

7. In socket parts for coupling and uncoupling with a stud part of snap fastened devices, said socket part comprising an imperforated breast wall terminating at its outer end in an inturned peripheral flange, a plurality of gripper fingers extending integrally from the inner end of said wall and arranged in their entirety within circumferential boundaries of the wall, the free ends of said fingers having inwardly projecting rounded stud engaging grippers, said fingers between the grippers and the inner end of said wall being parallel to the axis of the socket part, and said grippers extending beyond the outer surfaces of said fingers.

8. In socket parts for coupling and uncoupling with a stud part of snap fastener devices, said socket part comprising an imperforated breast wall terminating at its outer end in an inturned peripheral flange, a plurality of gripper fingers extending integrally from the inner end of said wall and arranged in their entirety within circumferential boundaries of the wall, the free ends of said fingers having inwardly projecting rounded stud engaging grippers, said fingers between the grippers and the inner end of said wall being parallel to the axis of the socket part, said grippers being hook shaped in cross sectional form with the hooks thereof directly outwardly, and a spring ring mounted in said hook shaped grippers and retained against displacement from the fingers by said grippers.

9. In socket parts for coupling and uncoupling with a stud part of snap fastener devices, said socket part comprising an imperforated breast wall terminating at its outer end in an inturned peripheral flange, a plurality of gripper fingers extending integrally from the inner end of said wall and arranged in their entirety within circumferential boundaries of the wall, the free ends of said fingers having rounded stud engaging grippers projecting beyond inner and outer surfaces of said fingers, said fingers between the grippers and the inner end of said wall being parallel to the axis of the socket part, and said grippers being substantially circular in cross sectional form.

OTTO J. HUELSTER.

REFERENCES CITED

The following references are of record in the file of this patent:

UNITED STATES PATENTS

| Number | Name | Date |
| --- | --- | --- |
| 570,069 | Stirckler | Oct. 27, 1896 |
| 755,582 | Richardson | Mar. 22, 1904 |
| 1,192,947 | Simons | Aug. 1, 1916 |
| 1,496,637 | Holmes | June 3, 1924 |
| 1,776,513 | Knutson | Sept. 23, 1930 |
| 2,212,361 | Arthur | Aug. 20, 1940 |
| 2,300,292 | Jones | Oct. 27, 1942 |